Figure 1:
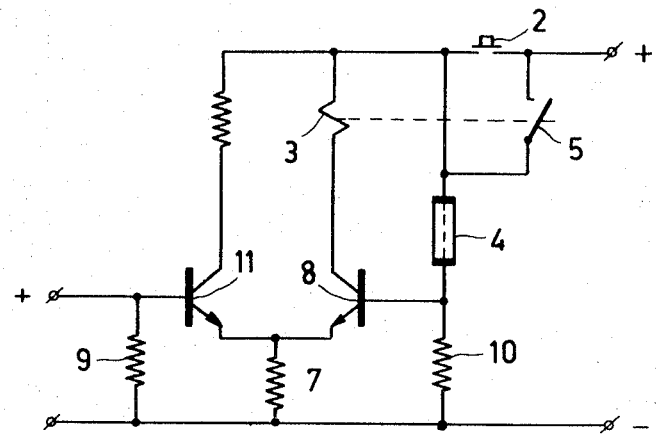

United States Patent

[11] 3,569,702

| | | |
|---|---|---|
| [72] | Inventor | Raymond Georges Schayes<br>Bruxelles, Belgium |
| [21] | Appl. No. | 706,237 |
| [22] | Filed | Feb. 19, 1968 |
| [45] | Patented | Mar. 9, 1971 |
| [73] | Assignee | Manufacture Belge De Lampes Et De<br>Materiel Electronique en Abrege M.B.L.E.<br>Brussels, Belgium |
| [32] | Priority | Feb. 22, 1967 |
| [33] | | Netherlands |
| [31] | | 6702652 |

[54] THERMOLUMINESCENT DOSIMETER WITH CONTROLLED HEATING
14 Claims, 4 Drawing Figs.

[52] U.S. Cl................................................. 250/71.5,
219/501, 219/505, 250/71, 250/83

[51] Int. Cl.................................................. G01t 1/11
[50] Field of Search.......................................... 250/71,
71.5, 83; 219/501, 504, 505

[56] References Cited
UNITED STATES PATENTS

| | | | |
|---|---|---|---|
| 3,136,877 | 6/1964 | Heller............................ | 219/501 |
| 3,376,416 | 4/1968 | Rutland et al. ................ | 250/83.3 |
| 3,385,956 | 5/1968 | Ohara et al. ................... | 219/505 |

Primary Examiner—Archie R. Borchelt
Assistant Examiner—Morton J. Frome
Attorney—Frank R. Trifari ABSTRACT: A thermoluminescent dosimetery system in which the dosimeter heating current is automatically interrupted as a given function of the resistance of the dosimeter heating element.

INVENTOR.
RAYMOND G. SCHAYES

THERMOLUMINESCENT DOSIMETER WITH CONTROLLED HEATING

The present invention relates to a measuring instrument for thermoluminescent dosimeters, and more particularly to a system for automatically interrupting the dosimeter heating current when the thermoluminescent material attains a predetermined temperature. By means of such instruments the quantity of light emanating from the radiation-sensitive element of the dosimeter, upon heating, is measured. This quantity of light can be converted into a readable magnitude, the unit of which may be chosen in a given relationship to a quantity of ionizing radiation. In a thermoluminescent dosimeter the ionizing radiation is stored in a radiation-sensitive substance, for example, $CaF_2$, which upon being heated, radiates a quantity of light proportional to the captured radiation dose.

It is known that the conversion of radiation energy into light, with an increasing temperature of the radiation-sensitive element, can be plotted to form an intensity curve which has a plurality of peaks. These so-called first, second and third peaks may be accounted for by the properties of the radiation-sensitive material employed. The first and the second peaks are of little interest. An accurate indication of the dose of active radiation is obtained by measuring the intensity of the third peak. For this purpose the thermoluminescent element has to be heated to about 400° C.

When the dosimeter is heated, steps have to be taken to insure that heating ceases as soon as the dosimeter has reached a given temperature. For this temperature it is important that it should traverse the whole temperature range so as to pass beyond the so-called third peak in order to be sure that the whole charge is given off. The temperature should not be raised excessively, since otherwise infrared radiation from the heating element might affect the measurement, and furthermore the radiation sensitivity of the thermoluminescent substance at excessively high temperature is strongly reduced.

As a matter of course, the heating has to be interrupted in all dosimeters at an instant when a given temperature, which is the same in all dosimeters, is reached. However, it is not simply possible to fix the duration of heating once and for all times, i.e. to use the duration found for one dosimeter as a switching time for a plurality of dosimeters. The dosimeters will exhibit slight discrepancies, for example, with respect to heat capacity and radiation loss. The switching time furthermore depends upon the initial temperature of each dosimeter and upon the ambient temperature. As a result, the required switching time varies so that the correct instant for terminating the heating has to be determined separately for each dosimeter. Such an individual determination of the switching time renders the choice of the correct instant difficult.

An object of the invention is to overcome the above disadvantage of the prior art devices and to provide a device by which the heating current for dosimeters, comprising an electrical heating resistor, can be simply interrupted automatically when the desired temperature is attained. The invention is based on the recognition of the fact that the resistance value is, in general, dependent upon temperature, which temperature is a measure of the temperature of the thermoluminescent substance. Therefore, the resistance value of the heating resistor is a measure of the temperature attained by the thermoluminescent substance. According to the invention, the measuring apparatus comprises a device which compares a signal depending upon the resistance value of the heating resistor with a specific signal, and which interrupts the heating current when the latter signal is exceeded.

It has been found that the temperature variation during heating of the element affects the maximum value of the intensity of the radiated light. Therefore, according to the invention, it is preferred to adjust the heating process in the measuring instrument so that the temperature variation in the temperature range relevant to the measurement is always the same. Relevant steps have been proposed earlier. For thermoluminescent dosimeters comprising a heating element the measuring instrument may include current control means for keeping the effective value of the heating current constant during the rise in temperature. This control affects the output voltage of the voltage source that supplies the heating current. This voltage may be a direct voltage, in which case the heating current is also a direct current, the amplitude of which is adjusted to a constant value. It will be evident that such a control may be utilized for providing a simple device for testing the heating current. The voltage source may supply pulsatory voltages, in which case the control affects the height, the duration or the appearance of the pulses. The invention furthermore provides a device for interrupting the heating current at the correct instant, when such a supply source is employed, in which case the comparison signal varies accordingly.

Figure 2:
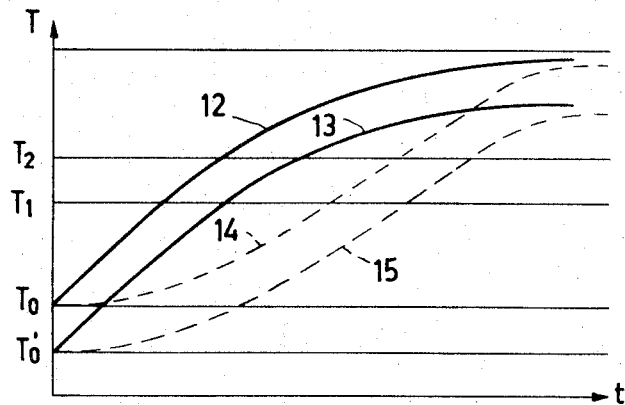
Figure 3:
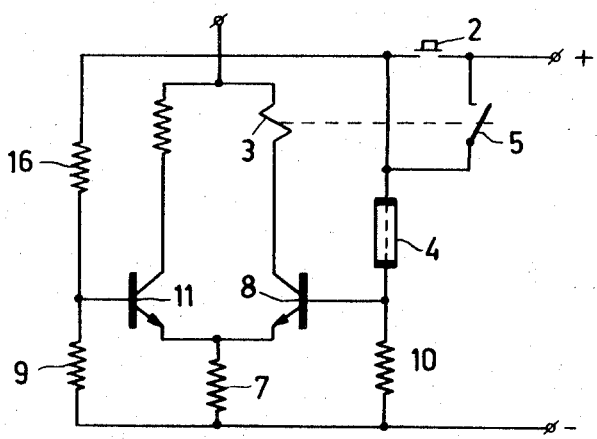
Figure 4:
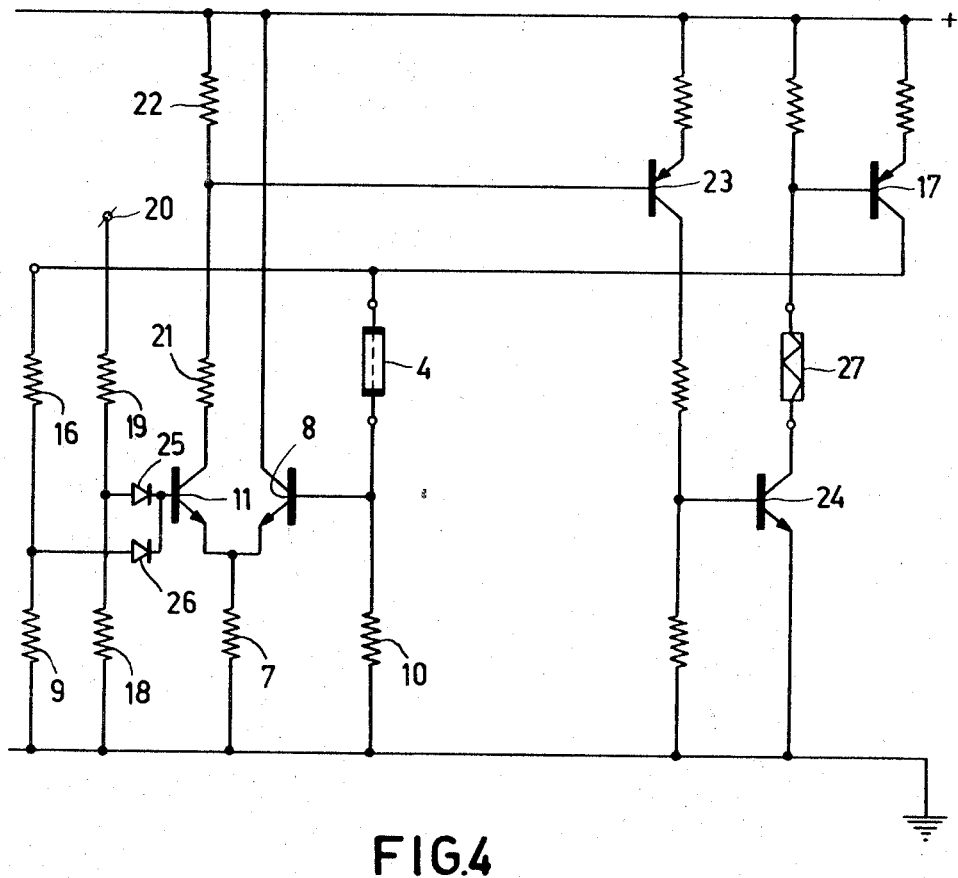

The device according to the invention will be described more fully with reference to the drawing, which shows a few embodiments of circuit diagrams and in which:

FIG. 1 shows a device which uses a direct current source to supply the heating current, FIG. 2 shows a number of graphs of the temperature variation as a function of time when the luminescent substance is heated, and FIGS. 3 and 4 show circuit diagrams of a device according to the invention for a measuring instrument, in which a constant heating current is supplied to the dosimeter.

The device shown in FIG. 1 comprises two current circuits having a common resistor 7. One current circuit includes the thermoluminescent dosimeter 4. By depressing the pushbutton switch 2, the relay coil 3 for the changeover contact 5 is energized as a result of the relevant potential adjustments of the transistor 8. When the heating of the dosimeter heating element is initiated, these potentials are not affected by the voltage across the resistor 9, which supplies the comparison signal in the second current circuit.

The control signal for the transistor 8 is supplied via a resistor 10, which is connected in series with the dosimeter 4. Upon an increase of the resistance of the heating element of the dosimeter 4 due to heating, the control voltage across the resistor 10 decreases to a value below the value of the reference voltage across the resistor 9 whereby the transistor 11 is made to conduct so that the voltage across the resistor 7 does not drop further. A further decrease in the control signal of the resistor 10 cuts off the transistor 8. The relay 5 is thus deenergized and the current through the dosimeter element 4 is interrupted.

When the dosimeter heating element is connected to a constant voltage the temperature of the element will increase approximately exponentially, at least with an increasing heat the rise of temperature will slow down gradually. In the curves of FIG. 2, the lines 12 and 13 exhibit the temperature variation for the case in which, at the beginning of the heating process, the initial temperatures are not the same, which may occur if the instrument is actuated at different ambient temperatures. the curves it will be obvious that the range of interest for the measurement lies between the temperatures $T_1$ and $T_2$ and is traversed more rapidly at the higher initial temperature $T_0$ than at the lower initial temperature $T_0'$. Equal quantities of stored radiation will then produce light peaks of different intensities. This disadvantage can be avoided by regulating the heating current, provided the effective value of the heating current remains the same during the heating process. Such a regulation has been proposed and its result is that the voltage of the supply source varies continually. The temperature variation then corresponds approximately to the curves 14 and 15 and the temperature range between $T_1$ and $T_2$ is traversed in this case within approximately the same time at different initial temperatures $T_0'$ and $T_0$.

Variations of the supply voltage should not affect the instant when the supply current of the heating element is interrupted. This condition is satisfied by the arrangement shown in FIG. 3. The supply voltage is applied through the pushbutton contact 2 to the current circuit including the dosimeter 4 and the resistor 10, the latter providing the control voltage for the transistor 8 to actuate the relay 3, which closes the changeover contact 5.

The supply voltage is furthermore applied to the series connection of two resistors 9 and 16, the voltage at the junction thereof serving as a control voltage for the transistor 11. The dosimeter 4, the resistor 10 and the two resistors 9 and 16 together constitute a bridge circuit. The equality of the control voltages of the two transistors 8 and 11 determines the instant when the relay 3 drops out of the circuit. The initial voltage across the resistor 10 remains the same in spite of the increase in resistance of the heating element in the dosimeter 4 at a constant value of the supply current. On the contrary, the control voltage across the transistor 11 varies as a result of the increasing strength of the supply voltage. As soon as this control voltage exceeds the voltage across the resistor 10, the relay 3 is deenergized. In order to prevent the current flow through the resistors 9 and 16 from influencing the effect to be obtained, these resistors have to be large as compared with the resistance of the heating element of the dosimeter and the resistor 10. It is preferable to use a separate, stabilized supply voltage for the transistor circuits.

A control device for interrupting the current at the correct instant in a dosimeter, which is also adapted to be fed by a constant current intensity, is shown in FIG. 4, in which case the same circuit system is employed. The current for the heating resistor of the dosimeter is supplied by a voltage source having a constant amplitude of the voltage through a control transistor 17. The current passes through the dosimeter 4 and the resistor 10 and the voltage thus produced across said resistor supplies the control signal for the transistor 8. In order to obtain a constant current through this circuit the control voltage of the transistor 8 is compared with a reference voltage of constant value. The reference voltage is obtained from a potentiometer circuit comprising the two resistors 18 and 19, connected at terminal 20 to a stabilized voltage, the potential of the junction serving as a control voltage for the transistor 11. The combination of the transistors 8 and 11, having a common emitter resistor 7, operates as a difference amplifier, the resultant voltage being derived therefrom by means of the potentiometer resistors 21 and 22. Via the amplifying circuit including the transistors 23 and 24, the output signal is applied to the base of the control transistor 17. Variations of the voltage across the resistor 10 with respect to the control voltage across the resistor 18 become operative, in an amplified state, across the control transistor 17, the current conduction of which varies accordingly so that these variations are compensated.

Through the bridge circuit including the dosimeter 4, the resistor 10 and the large resistors 9 and 16, a second comparison signal is produced at the junction of the two last-mentioned resistors, the value of which varies upon an increase of temperature and resistance of the heating element in the dosimeter 4. When the state of equilibrium of the bridge is reached, the potential at this junction exceeds the potential at the junction of the resistors 18 and 19. Via the gate formed by the diodes 25 and 26, the voltage across the resistor 9 operates as a control potential for the transistor 11 and the current through this circuit increases so that the current through the control transistor 17 increases. This results in a further increase of the voltage across the resistor 9 and this positive feedback produces a rapid increase of the current through the circuit including the transistor 24. This current energizes an electromagnet 27, which controls a break-contact (not shown) in the supply current circuit, so that this supply current circuit is rapidly interrupted. The difference amplifier thus operates as a control circuit for keeping the current constant until the required temperature of the dosimeter element is reached, after which it operates as a switching circuit for rapidly interrupting the heating process.

I claim:

1. A control system for a thermoluminescent dosimeter comprising, an electrical heating resistor, means for passing a heating current through said resistor so that the thermoluminescent substance is progressively heated and produces the light radiation to be measured, and means for interrupting the flow of said heating current at a given temperature of the luminescent substance of the dosimeter comprising, means for producing a first signal that is dependent upon the resistance of the heating element, means for producing a specific reference signal which is a measure of the resistance at the required temperature, and means for comparing said first signal and said reference signal to derive a difference signal increasing with time for interrupting the heating current when said substance reaches said given temperature.

2. A system as claimed in claim 1 further comprising a control device for keeping the intensity of the heating current constant.

3. A system as claimed in claim 1 further comprising a control device for keeping the effective value of the heating current constant.

4. A system as claimed in claim 1 further comprising means for regulating the heating current including, a voltage source, means for controlling the output voltage of said source as a function of the resistance variation of the heating element of the dosimeter, and means for coupling said voltage source to said system so that the first signal and the reference signal are proportional to the voltage of the voltage source.

5. A system as claimed in claim 1 further comprising a Wheatstone bridge having said heating resistor connected in one of the branches, means connecting the input terminals of the bridge to the voltage source so that the potential difference developed between the bridge output terminals is the difference signal for interrupting the heating current, the branch of the bridge connected to the same side of the voltage source as the heating resistor including a resistor having a considerably higher value of resistance than the resistance of the heating resistor.

6. A system as claimed in claim 3 wherein the control device includes a difference amplifier to which are applied a potential of constant value and a first signal which is proportional the the current through the heating resistor, and a gate circuit which applies the constant potential and a reference potential for determining the temperature of the heating resistor to the difference amplifier so that, when the reference potential exceeds the constant potential, the difference amplifier is controlled by the first-mentioned signal and the heating current is interrupted.

7. A thermoluminescent dosimeter control system comprising, a heater element for said dosimeter, a source of voltage coupled to said heater element to supply a heating current thereto that varies the resistance of said heater element, means for producing a control signal that varies with the resistance of said heater element, a source of reference voltage supplying a voltage related to a given critical temperature of the dosimeter thermoluminescent material, means for interrupting the current to said heater element, and means for comparing said control signal and said reference voltage thereby to actuate said interrupting means when said thermoluminescent material reaches said given temperature.

8. A system as claimed in claim 7 wherein said current interrupting means comprises a switch element connected in series with said voltage source and said heater element and controlled by an output signal of said comparing means.

9. A system as claimed in claim 7 wherein said current interrupting means comprises a relay having a switching contact connected in series with said heater element and said source of voltage, and said comparing means comprises first and second transistors having a common resistor connected in their respective emitter circuits, means connecting the energizing coil of said relay in the collector circuit of a first one of said transistors, means connecting the base electrode of one transistor to said reference voltage source and the base electrode of the other transistor to said heater element so that the base current thereof varies with the resistance of said heater element.

10. A system as claimed in claim 9 further comprising means for biasing said other transistor into conduction at the start of a heating cycle and wherein said reference voltage source initially biases said one transistor into the cutoff state.

11. A system as claimed in claim 7 further comprising first, second and third impedance elements connected together with said heater element to form a wheatstone bridge, means connecting the input terminals of said bridge across said voltage source whereby a reference voltage that varies with the source voltage is produced at one output terminal of the bridge and said control signal is produced at the other output terminal of the bridge, and means connecting said bridge output terminals to the input of said comparing means.

12. A system as claimed in claim 11 wherein said current interrupting means comprises a switch element connected in series with said voltage source and one input terminal of said bridge, and means for supplying a separate regulated voltage to said comparing means.

13. A system as claimed in claim 7 further comprising first, second and third impedance elements connected together with said heater element to form a wheatstone bridge, a current control element connected between said voltage source and the input terminals of said bridge and having a control electrode for regulating the flow of current therein, gating circuit means having first and second input terminals and an output terminal connected to one input terminal of said comparing means, means connecting the output of said reference voltage source to said gating circuit first input terminal, means connecting one output terminal of said bridge to said gating circuit second input terminal, means connecting the other output terminal of the bridge to a second input terminal of said comparing means, and means for coupling the output of said comparing means to the control electrode of said current control element in a sense to cause said control element to maintain a constant current in said heater element.

14. A system as claimed in claim 13 wherein said comparing means comprises a difference amplifier biased by said reference voltage source and said bridge circuit so as to maintain a constant current in said heater element until said thermoluminescent material reaches said given temperature whereupon said difference amplifier operates as a switching element for interrupting the flow of current to said heater element.